US009965740B1

(12) United States Patent
Perrine

(10) Patent No.: US 9,965,740 B1
(45) Date of Patent: May 8, 2018

(54) RETURN MERCHANDISE AUTHORIZATION ASSET RECOVERY

(71) Applicant: Sprint Communications Company L.P., Overland Park, KS (US)

(72) Inventor: Stephen D. Perrine, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 825 days.

(21) Appl. No.: 14/522,584

(22) Filed: Oct. 24, 2014

(51) Int. Cl.
  *G06Q 30/00* (2012.01)
  *G06Q 10/08* (2012.01)
  *G06Q 20/40* (2012.01)

(52) U.S. Cl.
  CPC ....... *G06Q 10/0837* (2013.01); *G06Q 20/407* (2013.01)

(58) Field of Classification Search
  CPC ................................. G06Q 10/0837
  USPC ....................................... 705/340
  See application file for complete search history.

(56) References Cited

U.S. PATENT DOCUMENTS

| 5,894,596 A * | 4/1999 | Hayes, Jr. | H04W 8/22 455/410 |
| 8,548,459 B1 * | 10/2013 | Carmody | H04W 24/04 455/423 |
| 2002/0153410 A1 * | 10/2002 | Santini | G06Q 10/10 235/375 |
| 2010/0299748 A1 * | 11/2010 | Johansson | G06F 21/6209 726/19 |
| 2015/0269585 A1 * | 9/2015 | Patnam | G06Q 30/014 705/303 |

* cited by examiner

*Primary Examiner* — Shannon S Campbell
*Assistant Examiner* — Zeina Elchanti

(57) ABSTRACT

An application server for non-returned return merchandise authorization (RMA) asset recovery. The application comprises an application stored in the memory that, when executed by the processor, examines related entries in a data store for status of return merchandise authorization mobile communication devices, and calculates time duration since shipment of the replacement mobile communication device unless a return merchandise authorization mobile communication device is received that was replaced by the replacement mobile communication device. The application further examines provisioning status of return merchandise authorization mobile communication devices, and responsive to return merchandise authorization mobile communication devices being associated with a new telephone number, suspends communication service to the return merchandise authorization mobile communication device and the corresponding replacement mobile communication device.

20 Claims, 8 Drawing Sheets

RETURN MERCHANDISE AUTHORIZATION ASSET RECOVERY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Return merchandise authorization is a part of a process of returning a product in order to receive a repair, replacement, or refund before the product's warranty period ends. The purchaser usually contacts the manufacturer to obtain authorization to return the product. A return merchandise authorization number is generated at that moment. A replacement product and a return merchandise authorization kit are then sent to the purchaser, typically with the return merchandise authorization number. The return merchandise authorization kit typically includes a return mailing label, related paperwork for the purchaser to fill out, and a return box to mail the original product with. The purchaser is supposed to mail back the original product with the completed paperwork and the rest of the return merchandise authorization kit including the return merchandise authorization number. The return merchandise authorization number makes it easier for the manufacturer to identify the return merchandise authorization case and may cause problems when it is missing.

SUMMARY

In an embodiment, an application server for non-returned return merchandise authorization (RMA) asset recovery is disclosed. The application server comprises a memory, a processor, and an application stored in the memory that, when executed by the processor, examines related entries in a data store for status of return merchandise authorization mobile communication devices, records a shipment date of a replacement mobile communication device, and calculates time duration since shipment of the replacement mobile communication device unless a return merchandise authorization mobile communication device is received that was replaced by the replacement mobile communication device. The application further examines provisioning status of return merchandise authorization mobile communication devices. Responsive to return merchandise authorization mobile communication devices being associated with a new telephone number, the application further suspends communication service to the return merchandise authorization mobile communication device and the corresponding replacement mobile communication device. Responsive to no return merchandise authorization mobile communication device being received, the application further sends a notice to an application programming interface to suspend communication service to the replacement mobile communication device.

In an embodiment, a method of recovering a non-returned return merchandise authorization (RMA) asset is disclosed. The method comprises storing shipment status of replacement mobile communication devices at a data store, storing entries with status of return merchandise authorization mobile communication devices on the data store, and examining related entries in the data store for the status of the return merchandise authorization mobile communication devices. The method further comprises recording a shipment date of a replacement mobile communication device by an application on an application server, and calculating time duration since the shipment date of the replacement mobile communication device unless a return merchandise authorization mobile communication device is received that was replaced by the replacement mobile communication device. The method further comprises examining provisioning status of return merchandise authorization mobile communication devices. The method further comprises responsive to return merchandise authorization mobile communication devices being associated with a new telephone number, suspending communication service to the return merchandise authorization mobile communication device and the corresponding replacement mobile communication device. The method further comprises responsive to no return merchandise authorization mobile communication device being received, when the time duration reaches a predefined amount, responsive to the replacement mobile communication device being activated, sending a reminder to the replacement mobile communication device for returning the return merchandise authorization mobile communication device, and when the time duration is one day larger than the predefined period of time, sending a notice to an application programming interface to suspend communication service to the return merchandise authorization mobile communication device and the replacement authorization mobile communication device. The method further comprises responsive to no return merchandise authorization mobile communication device being received, flagging in a provisioning data store the replacement authorization mobile communication device and the return merchandise authorization mobile communication device that has passed a due date for return, and provisioning the replacement mobile communication device associated with the return merchandise authorization mobile communication device that has passed the due date for return by an application programming interface (API) on a provisioning server to suspend communication service to the replacement mobile communication device.

In an embodiment, a method of recovering a non-returned return merchandise authorization (RMA) asset is disclosed. The method comprises recording a shipment date of a replacement mobile communication device by an application on an application server, and calculating time duration since the shipment date of the replacement mobile communication device unless a return merchandise authorization mobile communication device is received that was replaced by the replacement mobile communication device. The method further comprises examining provisioning status of return merchandise authorization mobile communication devices. The method further comprises responsive to return merchandise authorization mobile communication devices being associated with a new telephone number, suspending communication service to the return merchandise authorization mobile communication device and the corresponding replacement mobile communication device. The method further comprises responsive to no return merchandise authorization mobile communication device being received, when the time duration is one day larger than the predefined period of time, sending a notice to an application programming interface to suspend communication service to the replacement merchandise authorization mobile communication device, and flagging the return merchandise authorization mobile communication device that has passed a due date for return in a provisioning data store.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
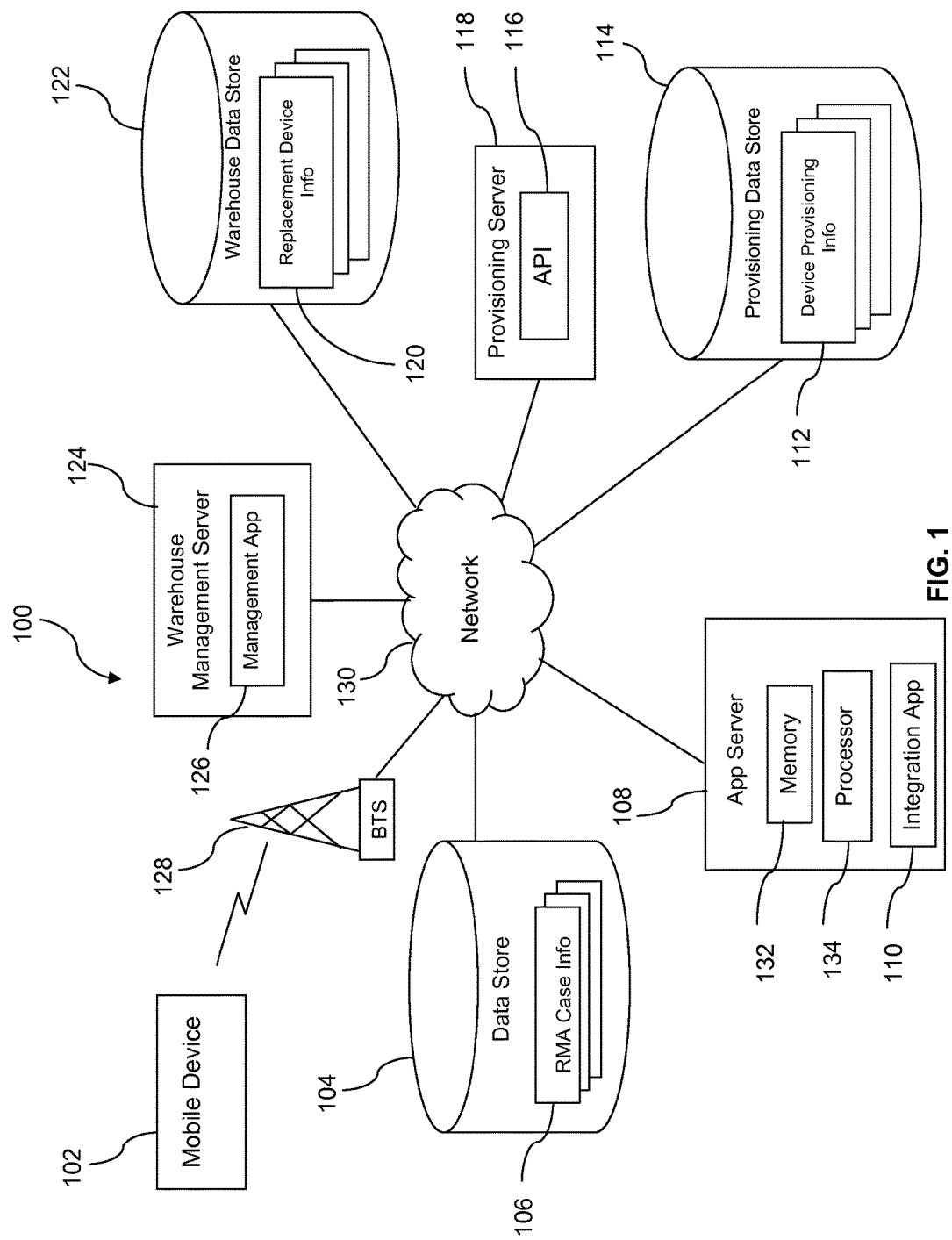
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

When a purchaser requests to return or exchange a product, for example when a user of a mobile communication device requests to a wireless communications service provider to return or exchange the mobile communication device, a return merchandise authorization case may be created. A replacement mobile communication device may be sent by the wireless communications service provider with a return merchandise authorization kit and a return merchandise authorization number. The user is supposed to mail the original mobile communication device back to the wireless communications service provider. However, due to various reasons, for example the user forgetting to attach the return merchandise authorization number, undeliverable return mobile communication device, the user simply giving the original mobile communication device to a family member, or another reason, the original mobile communication device and/or the return merchandise authorization number is not returned. A missing return merchandise authorization number may make it more difficult for the wireless communications service provider to identify the return merchandise authorization case. Missing original mobile communication devices that were replaced by replacement mobile communication devices may affect profit of the wireless communications service provider. The present disclosure teaches a system and method for monitoring return merchandise authorization case status and suspending communication service for relevant mobile communication devices under predefined circumstances.

For example, when a wireless communications service provider approves a return merchandise authorization process upon a user's request, a return merchandise authorization case is initiated and a return merchandise authorization number is assigned to the case. An entry may be created in a data store for information on the return merchandise authorization case, comprising information on an original mobile communication device, referred to as a return merchandise authorization mobile communication device herein. When a replacement mobile communication device is to be shipped from a warehouse of the wireless communications service provider to replace the return merchandise authorization mobile communication device, an entry may be created in a warehouse data store (for example, a data store containing information on operations of a distribution center that warehouses mobile communication devices prior to order fulfillment and shipping to end users and/or to retail stores) to store information on the replacement mobile communication device. The entry may comprise information that is related to or associated with the return merchandise authorization case on the data store. When the replacement mobile communication device is shipped from the warehouse, a warehouse management system may record shipment information of the replacement mobile communication device by updating the entry in the warehouse data store. The replacement mobile communication device shipment information and the associated return merchandise authorization case information may be sent from the warehouse data store to the data store.

An integration application on an application server may examine entries on the data store for status of the return merchandise authorization mobile communication devices. The integration application may also record a shipment date of a replacement mobile communication device and start counting elapsed time in units of days from the shipment date of the replacement mobile communication device. When the return merchandise authorization mobile communication device is received at the wireless communications service provider, the integration application may stop counting the elapsed time and the return merchandise authorization case is considered to be completed. If no return merchandise authorization mobile communication device is received at the wireless communications service provider, the integration application may continue counting the elapsed time.

The integration application may periodically examine provisioning information on the return merchandise authorization mobile communication device. When the integration application detects that the return merchandise authorization mobile communication device has been activated, remains activated, and/or is associated with a new telephone number different from a telephone number before the return merchandise authorization case was created, the integration application may send a notification to an application programming interface of a provisioning server and/or provisioning system to suspend communication service to the return merchandise authorization mobile communication device. The integration application may also include in the notification a request to the application programming interface to suspend communication service to the corresponding replacement mobile communication device if the replacement mobile communication device is activated for communication service and/or to flag in device provisioning information to prevent the replacement mobile communication device from future activation for communication service if the replacement mobile communication device is not yet activated for communication service. This action(s) may be taken before and/or after the elapsed time reaches a predefined amount, for example 45 days, or another amount, when the return merchandise authorization mobile communication device is associated with a new telephone number. When the elapsed time reaches the predefined amount, for example 45 days, or another amount, the integration application may examine the device provisioning information of the replacement mobile communication device. When the replacement mobile communication device is not activated, the replacement mobile communication device may not have been received by the user. Customer service may contact the user, for example through a text message, a phone call, or in another manner, to inquire about receipt of the replacement mobile communication device. On the other hand, if the replacement mobile communication device is activated, a reminder may be sent by the integration application to the replacement mobile communication device for returning the return merchandise authorization mobile communication device. When the elapsed time is one day larger than the predefined amount, for example 46 days, a notice may be sent by the integration application to the application programming interface to suspend communication service to the replacement mobile communication device. The integration application may locate the associated return merchandise authorization mobile communication device by examining the entry for the replacement mobile communication device in the data store.

The integration application may notify the application programming interface to suspend communication service to the return merchandise authorization mobile communication device. A record of the replacement mobile communication device in a provisioning data store may be flagged as communication service suspended. When the user realizes that the replacement mobile communication device is out of communication service and calls customer care at the wireless communications service provider, the user may be notified that by returning the return merchandise authorization mobile communication device, the communication service for the replacement mobile communication device may be resumed. When the communication service for the replacement mobile communication device is resumed, the record for the replacement mobile communication device may be un-flagged on the provisioning data store.

Turning now to FIG. 1, a communication system 100 is described. In an embodiment, the system 100 comprises a plurality of mobile communication devices 102, a data store 104, an application server 108, a provisioning data store 114, a provisioning server 118, a warehouse data store 122, and a warehouse management server 124. The application server 108 may comprise an integration application 110, a memory 132, and a processor 134. The mobile communication device 102 is configured to use a cellular radio transceiver to establish a wireless communication link with a base transceiver station 128, and the base transceiver station 128 provides communications connectivity of the device 102 to a network 130. The data store 104, the application server 108, the provisioning data store 114, the provisioning server 118, the warehouse data store 122, and the warehouse management server 124 may also have access to the network 130. The network 130 may comprise any combination of private and public networks.

It is understood that the system 100 may comprise any number of mobile communication devices 102 and any number of base transceiver stations 128. The collectivity of base transceiver stations 128 may be said to comprise a radio access network, in that these base transceiver stations 128 may provide radio communication links to the mobile communication devices 102 to provide access to the network 130. The radio access network may be abstracted in different ways and may comprise, in addition to the base transceiver stations 128, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the mobile communication devices 102.

The cellular radio transceiver of the mobile communication device 102 may communicate with the base transceiver station 128 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. The device 102 may be any of a laptop computer, a notebook computer, a tablet computer, a mobile phone, a personal digital assistant (PDA), a media player, or another mobile communication device. In an embodiment, the mobile communication device 102 may have other components (not shown) such as a cellular radio transceiver, a near field communication (NFC) radio transceiver, a wireless local area network (WLAN) radio transceiver, or other components.

The warehouse data store 122 may store replacement mobile communication device information 120 comprising association with return merchandise authorization case information 106 on the data store 104. An entry may be created in the warehouse data store 122 to store relevant information on a replacement mobile communication device and the association with a return merchandise authorization case information 106 when a return merchandise authorization process is initiated, for example by request from a user. When the replacement mobile communication device is shipped, a worker at the warehouse may update the entry in the warehouse data store 122 to store tracking information on the replacement mobile communication device, for example by scanning identification information of the replacement mobile communication device before it is shipped. The entry in the data store 122 may comprise associated return merchandise authorization case information 106, a shipment time, a shipment date, tracking information, or other related information on the shipped replacement mobile communication device.

A warehouse management application 126 that executes on the warehouse management server 124 may manage the warehouse data store 122 and send information stored on the warehouse data store 122 to relevant destinations. For example, the warehouse management application 126 may periodically send entries for the replacement mobile communication devices from the warehouse data store 122 to the data store 104. Alternatively, the warehouse management application 126 may send entries of the replacement mobile communication devices from the warehouse data store 122 to the data store 104 when a triggering event occurs, for example at shipment of a replacement mobile communication device.

In an embodiment, the provisioning data store 114 may store device provisioning information 112 about the mobile communication devices 102. For example, when communication service for a mobile communication device 102 is suspended, a field of an associated device provisioning information 112 entry may be flagged on the provisioning data store 114. The flag may control access of the mobile communication device 102 to the radio access network and the mobile communication device 102 may not be able to utilize normal wireless communication services except 911 calls or customer care calls. When the service for the mobile communication device 102 is resumed, the field of the entry for the mobile communication device 102 may be un-flagged to indicate that the mobile communication device is in communication service. And the un-flagged mobile communication device 102 may utilize normal wireless communication services besides 911 calls and customer care calls. The application 110 may send a notice to the provisioning data store 114 to set this field of the entry when communication service status of a mobile communication device is determined or changed. When the application programming interface 116 provisions mobile communication devices 102, the field of the entry may be examined to determine whether a mobile communication device 102 may be provisioned.

An application programming interface (API) 116 on the provisioning server 118 may be used to provision mobile communication devices 102. For example, the application programming interface 116 may be used to stop/halt/pause/suspend communication service to a mobile communication device 102, for example a return merchandise authorization (RMA) mobile communication device that has passed a due date. When an integration application 110 on the application server 108 determines that a return merchandise authorization mobile communication device has passed the due date and the return merchandise authorization mobile communication device has not been received, the integration application 110 may locate a corresponding device provisioning information 112 entry in the provisioning data store 114 based on the return merchandise authorization case information 106 entry in the data store 104. The integration application 110 may send a notice to the application programming interface 116 to suspend communication service to the return merchandise authorization mobile communication device. The associated field of the entry in the provisioning data store 114 may be flagged. The application programming interface 116 may also be used to resume the communication service to a mobile communication device 102.

The data store 104 may store return merchandise authorization case information 106. The return merchandise authorization case information 106 may comprise information on return merchandise authorization mobile communication devices and/or associated replacement mobile communication devices, for example tracking information, delivery information, undeliverable status, no return merchandise authorization number status, return merchandise authorization process cancellation status, or other information on the return merchandise authorization mobile communication device. The return merchandise authorization case information 106 may also comprise shipment information on an associated replacement mobile communication device of a return merchandise authorization mobile communication device.

A file may be sent to the data store 104 comprising a piece of the above information, for example a return merchandise authorization device shipment file comprising the shipment information of the return merchandise authorization mobile communication device, a return merchandise authorization device receipt file on the receipt of the return merchandise authorization mobile communication device, or another file on another piece of information of the replacement mobile communication device or the associated return merchandise authorization mobile communication device. An entry may be created for each return merchandise authorization case corresponding to a return merchandise authorization mobile communication device to store the relevant information. The data store 104 may send a notice to the integration application 110 when a new file is received at the data store 104. Alternatively, the integration application 110 may periodically examine the data store 104 for any updates.

For example, the return merchandise authorization mobile communication device information 106 may be requested from the data store 104 by the integration application 110, for example the shipment time, the shipment date, the tracking information, or other related information. When the return merchandise authorization mobile communication device is dropped off at a courier, for example at a postal office, for shipment, a return merchandise authorization shipment file may be received at the data store 104 from a reporting application. When the return merchandise authorization mobile communication device is received at a local courier, a return merchandise authorization receipt file may be received at the data store 104 from the reporting application. When the return merchandise authorization mobile communication device is undeliverable, a return merchandise authorization undeliverable/refused file may be received at the data store 104 from the reporting application. The replacement mobile communication device associated with the undeliverable return merchandise authorization mobile communication device may be exempt from communication service suspension. When the return merchandise authorization mobile communication device with a receipt but without a return merchandise authorization number is received at the wireless communications service provider, an associated mobile equipment identifier (MEID) may be determined and sent to the data store 104. When the return merchandise authorization process is cancelled without a receipt, the data store 104 may be notified, and the integration application 110 may stop counting the elapsed time and drop the case.

The integration application 110 on the application server 108 may integrate information on a replacement mobile communication device and an associated return merchandise authorization mobile communication device and take action under predefined circumstances. A return merchandise authorization process is a part of a process of returning a product in order to receive a repair, replacement, or refund before the product's warranty period ends. In an embodiment, a replacement mobile communication device may be sent to a user to replace an associated return merchandise authorization mobile communication device in a return merchandise authorization process, and the user is supposed to mail back the return merchandise authorization mobile communication device to the provider of the replacement mobile communication device.

The integration application 110 may periodically check the data store 104 for updates on the return merchandise authorization case information 106. The return merchandise authorization case information 106 may comprise information on return merchandise authorization mobile communication devices and replacement mobile communication devices. Alternatively, the data store 104 may send a notice to the integration application 110 when any update is made to the entries with the return merchandise authorization case information 106. Similarly, the integration application 110 may periodically check the warehouse data store 122 for updates on the replacement mobile communication device information 120. The replacement mobile communication device information 120 may comprise information on replacement mobile communication devices. Alternatively, the warehouse data store 122 may send a notice to the integration application 110 when any update is made to the entries with the replacement mobile communication device information 120. Additionally, the integration application 110 may periodically check the provisioning data store 114 for updates on the device provisioning information 112. The device provisioning information 112 may comprise provisioning information on mobile communication devices that are supported by the wireless communications service provider. Alternatively, the provisioning data store 114 may send a notice to the integration application 110 when any update is made to the entries with the device provisioning information 112.

The integration application 110 may record the shipment date of the replacement mobile communication device. Elapsed time since the shipment of the replacement mobile communication device may be counted in units of days, and entries associated with a past due return merchandise authorization mobile communication device may be located in a variety of ways. For example, the integration application 110 may periodically calculate the elapsed time for the replacement mobile communication devices, for example every 12 hours, every day, or at another time interval. The elapsed time may be stored with the associated entry of a return merchandise authorization case in the data store 104. Alternatively, the integration application 110 may execute once per day, sort through all return merchandise authorization case information 106 entries in the data store 104 to find entries 106 pending at least 46 days, and then handle those specific cases. Alternatively, the return merchandise authorization case information 106 entries may be stored in time order, and the integration application 110 may process entries 106 in order until a first entry 106 less than 46 days old. Alternatively, the return merchandise authorization case information 106 entries may be stored in time order, and a pointer or delimiter may be kept between the return merchandise authorization case information 106 entries with day divisions of less than 46 days old and at least 46 days old.

The integration application 110 may periodically examine device provisioning information 112, for example on the return merchandise authorization mobile communication device. When the integration application 110 detects that the return merchandise authorization mobile communication device is activated, remains activated, and/or is associated with a new telephone number different from a telephone number before the return merchandise authorization case was created, the integration application 110 may send a notification to the application programming interface 116 to suspend communication service to the return merchandise authorization mobile communication device. The integration application 110 may also include in the notification a request to the application programming interface 116 to suspend communication service to the corresponding replacement mobile communication device if the replacement mobile communication device is activated for communication service and/or to flag in device provisioning information 116 to prevent the replacement mobile communication device from future activation for communication service if the replacement mobile communication device is not yet activated for communication service. This action(s) may be taken before and/or after the elapsed time reaches a predefined amount, for example 45 days, or another amount, when the return merchandise authorization mobile communication device is associated with a new telephone number.

The integration application 110 may calculate the elapsed time until an associated return merchandise authorization mobile communication device that was replaced by the replace mobile communication device is received, for example at a wireless communications service provider that shipped the replacement mobile communication device. When the associated return merchandise authorization mobile communication device is received at the wireless communications service provider, a return merchandise authorization case is completed and the elapsed time counting is stopped. On the other hand, when the associated return merchandise authorization mobile communication device is not received at the wireless communication service provider, the integration application 110 may continue with the calculation of the elapsed time.

When the elapsed time approaches the end of the predefined period of time, for example 30 days, 45 days, 50 days, or another amount of time, the integration application 110 may examine the device provisioning information 112 of the replacement mobile communication device. When the replacement mobile communication device is not activated, the replacement mobile communication device may not have been received by the user. Customer service may contact the user, for example through a text message, a phone call, or in another manner, to inquire about receipt of the replacement mobile communication device. On the other hand, if the replacement mobile communication device is activated, the integration application 110 may send a notice to the replacement mobile communication device for returning the return merchandise authorization mobile communication device. For example, the integration application 110 may send an email, a short message service (SMS) message, a phone call, or another type of notice to the replacement mobile communication device. The notice may comprise a reminder to a user of the replacement mobile communication device to return the associated return merchandise authorization mobile communication device that was replaced by the replacement mobile communication device.

In an embodiment, when the elapsed time is one day larger than the predefined period of time, for example 31 days, 46 days, 51 days, or another amount of days, the return merchandise authorization mobile communication device may be considered as past due if the return merchandise authorization mobile communication device has not been received, for example at the wireless communications service provider, as indicated by data entered in data stores 122 and/or 104. The integration application 110 may take action when the return merchandise authorization mobile communication device is past due. For example, the integration application 110 may send a notice to the application programming interface 116 to suspend communication service to the replacement mobile communication device. Additionally, the integration application 110 may determine whether the return merchandise authorization mobile communication device (e.g., the "old" device) is in communication service. If the return merchandise authorization mobile communication device is in communication service, the integration application 110 may send a notice to the application programming interface 116 to suspend communication service to the return merchandise authorization mobile communication device. If the return merchandise authorization mobile communication device is not in communication service, the integration application 110 may send a notice to the application programming interface 116 to set a flag to prevent the return merchandise authorization mobile communication device from being activated in the future for communication service.

Alternatively, the integration application 110 may send a notice to the application programming interface 116 to suspend the communication service to the return merchandise authorization mobile communication device or set the flag associated with the return merchandise authorization mobile communication device for future prevention from communication service at the day when the replacement mobile communication device is activated. When the replacement mobile communication device or the return merchandise authorization mobile communication device is suspended from communication service, 911 and customer care numbers may still be available to these mobile communication devices.

It should be noted that suspension of the communication service for the replacement mobile communication device and suspension of the communication service for the return merchandise authorization mobile communication device may be decoupled. For example, the communication service for the replacement mobile communication device may be suspended, and the communication service to the return merchandise authorization mobile communication device may not be suspended. Additionally, the communication service to the replacement mobile communication device and the return merchandise authorization mobile communication device may be suspended at different times. For example, the communication service for the replacement mobile communication device may be suspended when the return merchandise authorization mobile communication device is past due. On the other hand, the communication service for the return merchandise authorization mobile communication device may be suspended at a variety of times, for example immediately on hearing from the user that requests the return merchandise authorization case, at a time when the replacement mobile communication device is shipped, a period of time after the replacement mobile communication device is shipped based on expected shipping transit time, after a predefined period of time when the return merchandise authorization mobile communication device is considered to be past due, at the activation of the replacement mobile communication device, or at another time. When the return merchandise authorization mobile communication device is received at the wireless communications service provider after the communication service for the replacement mobile communication device has been suspended, the integration application 110 may send a notice to the application programming interface 116 to resume the communication service to the replacement mobile communication device.

Figure 2A:
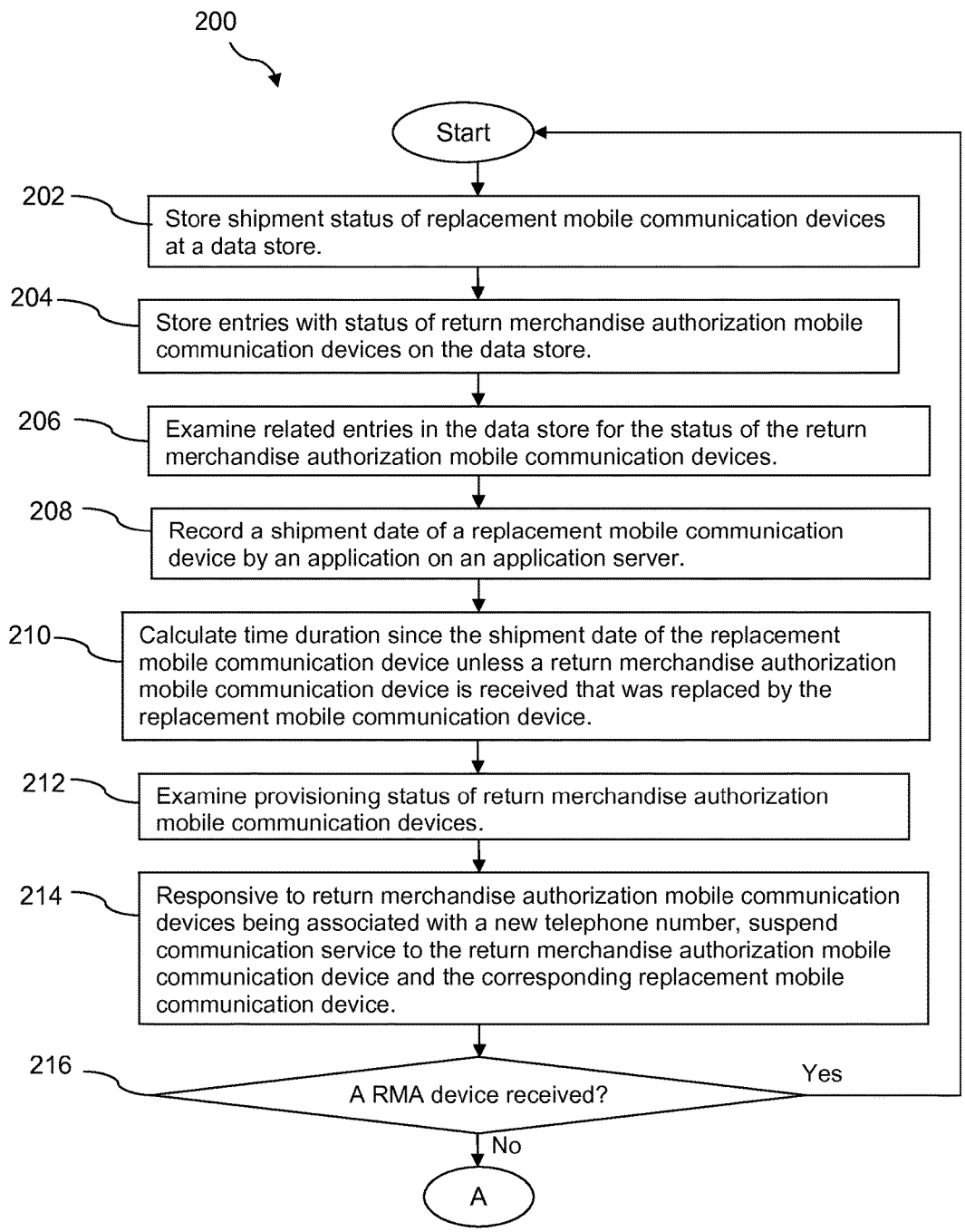
FIG. 2A and FIG. 2B is a flow chart illustrating a method according to an embodiment of the disclosure.
Figure 2B:
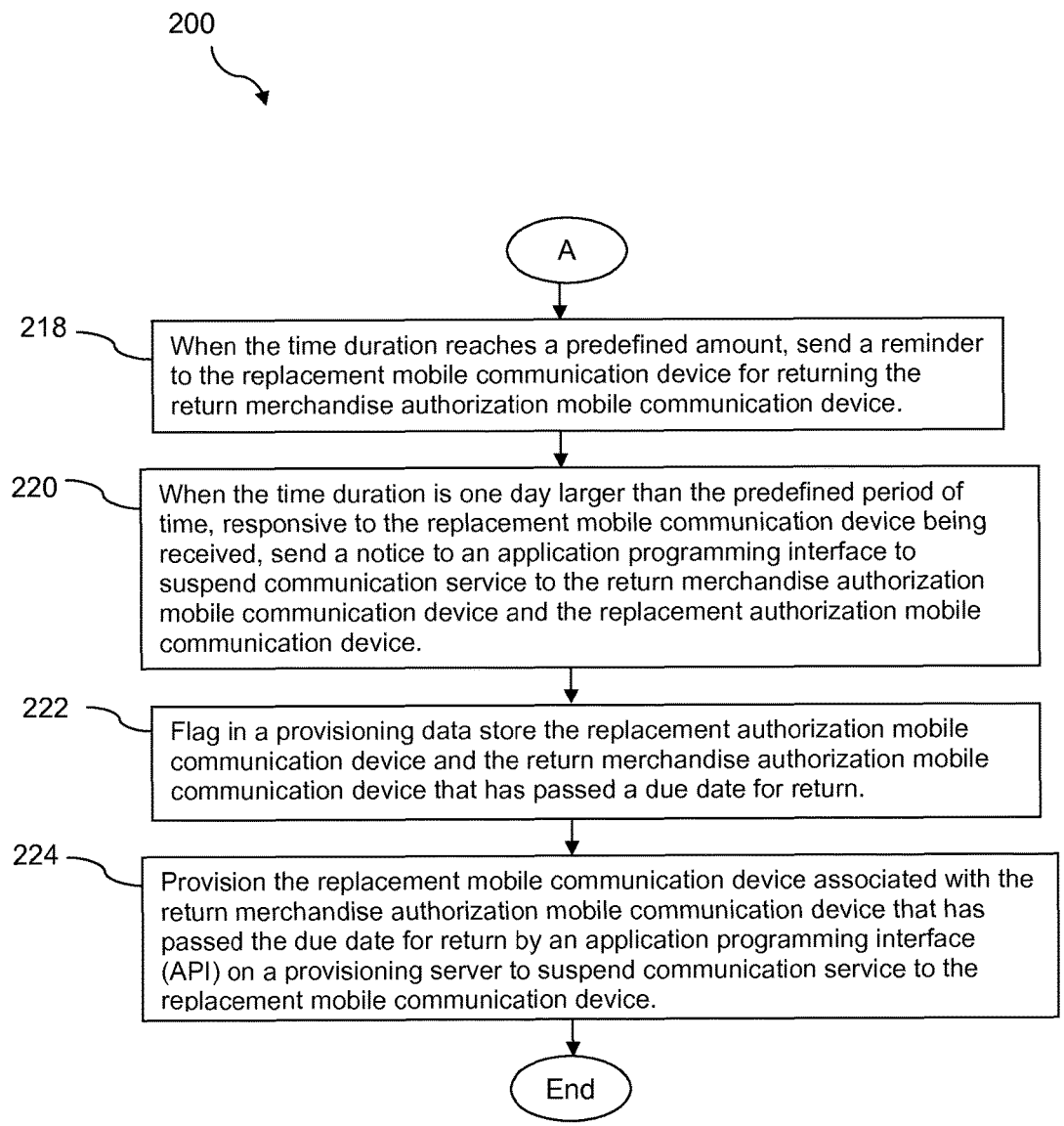

Turning now to FIG. 2, a method 200 is described. At block 202, shipment status of replacement mobile communication devices is stored at a data store. For example, shipment status of replacement mobile communication devices, for example shipment date, shipment time, tracking information, or other shipment information, is stored at the warehouse data store 122. The shipment status of the replacement mobile communication devices may then be sent from the warehouse data store to a data store. For example, the shipment status of the replacement mobile communication devices may be sent by the warehouse management application 126 from the warehouse data store 122 to the data store 104, and then be stored in the data store 104. At block 204, entries with status of return merchandise authorization mobile communication devices are stored on the data store. For example, entries with status of return merchandise authorization mobile communication devices are stored on the data store 104.

At block 206, related entries in the data store for the status of the return merchandise authorization mobile communication devices are examined. For example, related entries in the data store 104 for the status of the return merchandise authorization mobile communication devices are examined by the integration application 110. For example, the integration application 110 may periodically examine the related entries in the data store 104 for any update. Alternatively, the data store 104 may send a notice to the integration application 110 when any update is made to related entries in the data store 104. The integration application 110 may then request the data store 104 for updates for the related entries.

At block 208, a shipment date of a replacement mobile communication device is recorded by an application on an application server. For example, the integration application 110 may record a shipment date of a replacement mobile communication device.

At block 210, time duration is calculated since the shipment date of the replacement mobile communication device unless a return merchandise authorization mobile communication device is received that was replaced by the replacement mobile communication device. For example, the integration application 110 may calculate time duration since the shipment date of the replacement mobile communication device in units of days. The integration application 110 may calculate the time duration until the return merchandise authorization mobile communication device is received, which may complete a return merchandise authorization process. The return merchandise authorization mobile communication device may be the mobile communication device that was supposed to be replaced by the replacement mobile communication device.

At block 212, provisioning status of return merchandise authorization mobile communication devices is examined. For example, the integration application 110 may periodically examine a device provisioning information 112 entry associated with the return merchandise authorization mobile communication device, for example to determine whether or not the return merchandise authorization mobile communication device has been activated, remains activated, and/or is associated with a new telephone number different from a telephone number before the return merchandise authorization case was created. At block 214, responsive to return merchandise authorization mobile communication devices being associated with a new telephone number, communication service to the return merchandise authorization mobile communication device and the corresponding replacement mobile communication device is suspended. For example, when the return merchandise authorization mobile communication device is associated with a new telephone number. The integration application 110 may suspend communication service to both the return merchandise authorization mobile communication device and the corresponding replacement mobile communication device.

At block 216, it is determined whether or not a return merchandise authorization mobile communication device has been received. If the result of block 216 is true, which means a return merchandise authorization mobile communication device has been received, the method restarts from the beginning, block 202, when a new replacement mobile communication device is shipped. On the other hand, if the result of block 216 is false, which means no return merchandise authorization mobile communication device has been received, the method continues with block 218. At block 218, when the time duration reaches a predefined amount, responsive to the replacement mobile communication device being received, a reminder is sent to the replacement mobile communication device for returning the return merchandise authorization mobile communication device. For example, when the time duration reaches a predefined amount, for example 45 days, or another period of time, and when the replacement mobile communication device has been delivered (i.e. the integration application may inquire the replacement device information 120 entry), a reminder, for example an email, a phone call, a text message, or another kind of reminder, may be sent to the replacement mobile communication device for returning the return merchandise authorization mobile communication device.

At block 220, when the time duration is one day larger than the predefined period of time, a notice is sent to an application programming interface to suspend service to the return merchandise authorization mobile communication device and the replacement authorization mobile communication device. Here one day is a grace period, and the grace period may be other amount of time, for example two days, three days, a week, or another amount of time. For example, in the case of a one day grace period, when the time duration is one day larger than the predefined period of time, for example 46 days when the predefined period of time is 45 days, a notice may be sent to the application programming interface 116 to suspend communication service to the return merchandise authorization mobile communication device and the replacement authorization mobile communication device from the integration application 110. As another example, in the case of a two day grace period, when the time duration is two days larger than the predefined period of time, for example 47 days when the predefined period of time is 45 days, a notice may be sent to the application programming interface 116 to suspend communication service to the return merchandise authorization mobile communication device and the replacement authorization mobile communication device from the integration application 110.

At block 222, in a provisioning data store the replacement authorization mobile communication device and the return merchandise authorization mobile communication device that has passed a due date for return are flagged. For example, the replacement authorization mobile communication device and the return merchandise authorization mobile communication device that has passed a due date for return may be flagged in the provisioning data store 114. At block 224, the replacement mobile communication device associated with the return merchandise authorization mobile communication device that has passed the due date for return is provisioned by the application programming interface (API) on a provisioning server to suspend communication service to the replacement mobile communication device. For example, the replacement mobile communication device associated with the return merchandise authorization mobile communication device that has passed the due date for return may be provisioned by the application programming interface (API) 116 on the provisioning server 118 to suspend communication service to the replacement mobile communication device.

Figure 3:
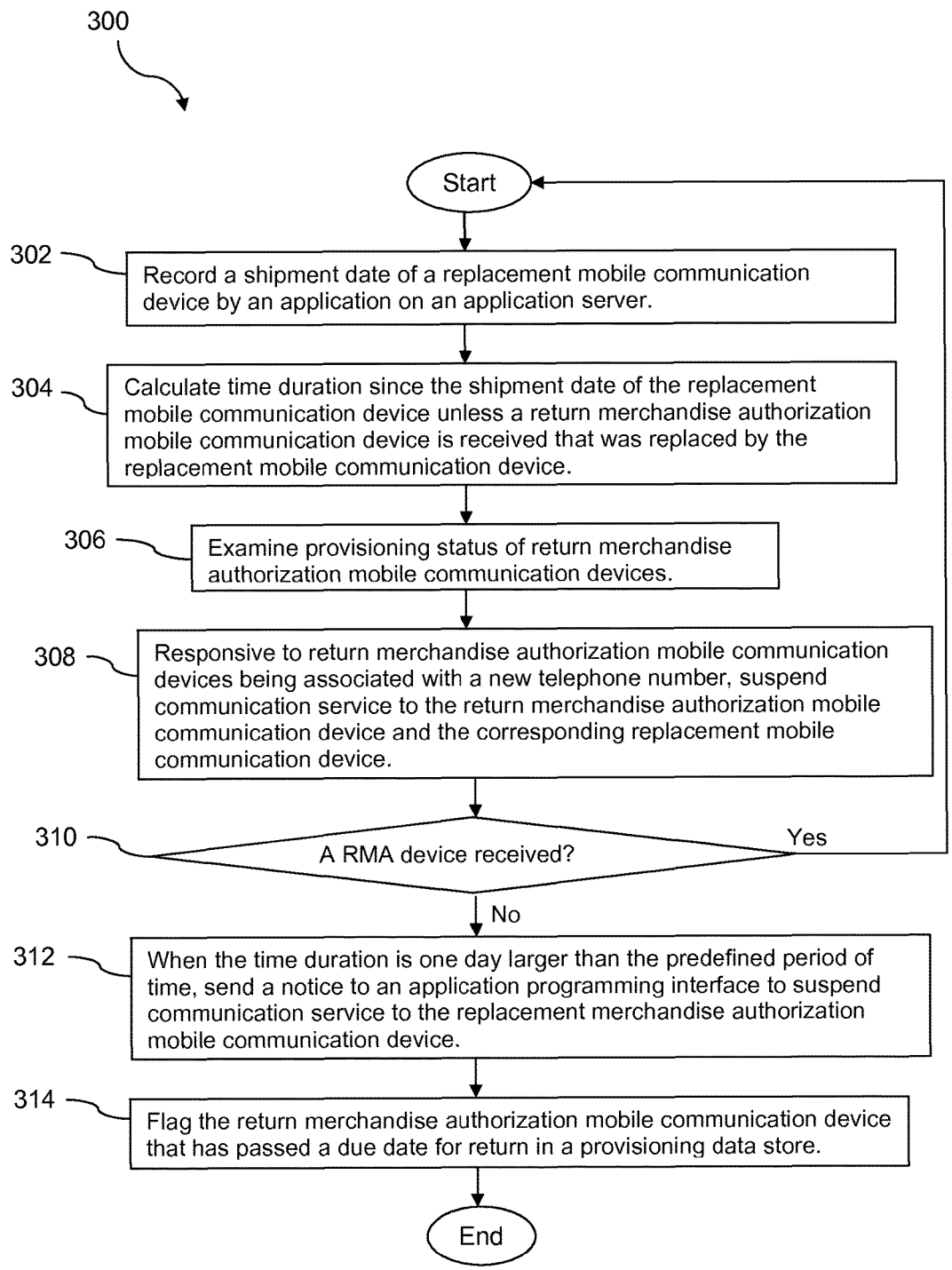
FIG. 3 is a flow chart illustrating another method according to an embodiment of the disclosure.

Turning now to FIG. 3, a method 300 is described. At block 302, a shipment date of a replacement mobile communication device is recorded by an application on an application server. For example, a shipment date of a replacement mobile communication device may be recorded by the integration application 110 on the application server 108 for future reference. At block 304, time duration is calculated, for example by the integration application 110, since the shipment date of the replacement mobile communication device unless a return merchandise authorization mobile communication device is received that was replaced by the replacement mobile communication device.

At block 306, provisioning status of return merchandise authorization mobile communication devices is examined. At block 308, responsive to return merchandise authorization mobile communication devices being associated with a new telephone number, communication service to the return merchandise authorization mobile communication device and the corresponding replacement mobile communication device is suspended.

At block 310, it is determined whether or not a return merchandise authorization mobile communication device has been received. If the result of block 310 is true, which means a return merchandise authorization mobile communication device has been received, the method restarts from the beginning, block 302, when a new replacement mobile communication device is shipped. On the other hand, if the result of block 310 is false, which means no return merchandise authorization mobile communication device has been received, the method continues with block 312. At block 312, when the time duration is one day larger than the predefined period of time, a notice is sent to an application programming interface to suspend communication service to the replacement merchandise authorization mobile communication device. For example, when the time duration since the shipment date of the replacement mobile communication device is one day larger than the predefined period of time, for example 46 days when the predefined period of time is 45 days, a notice may be sent by the integration application 110 to the application programming interface 116 to suspend communication service to the replacement merchandise authorization mobile communication device. At block 314, the return merchandise authorization mobile communication device is flagged that has passed a due date for return in a provisioning data store. For example, the return merchandise authorization mobile communication device may be flagged that has passed a due date for return in the provisioning data store 114.

Figure 4:
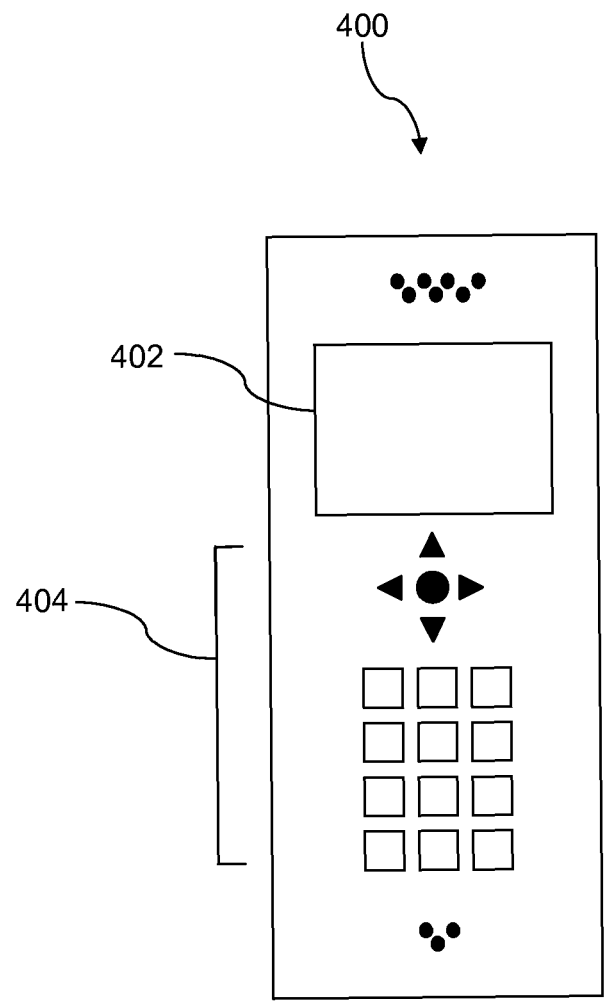
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
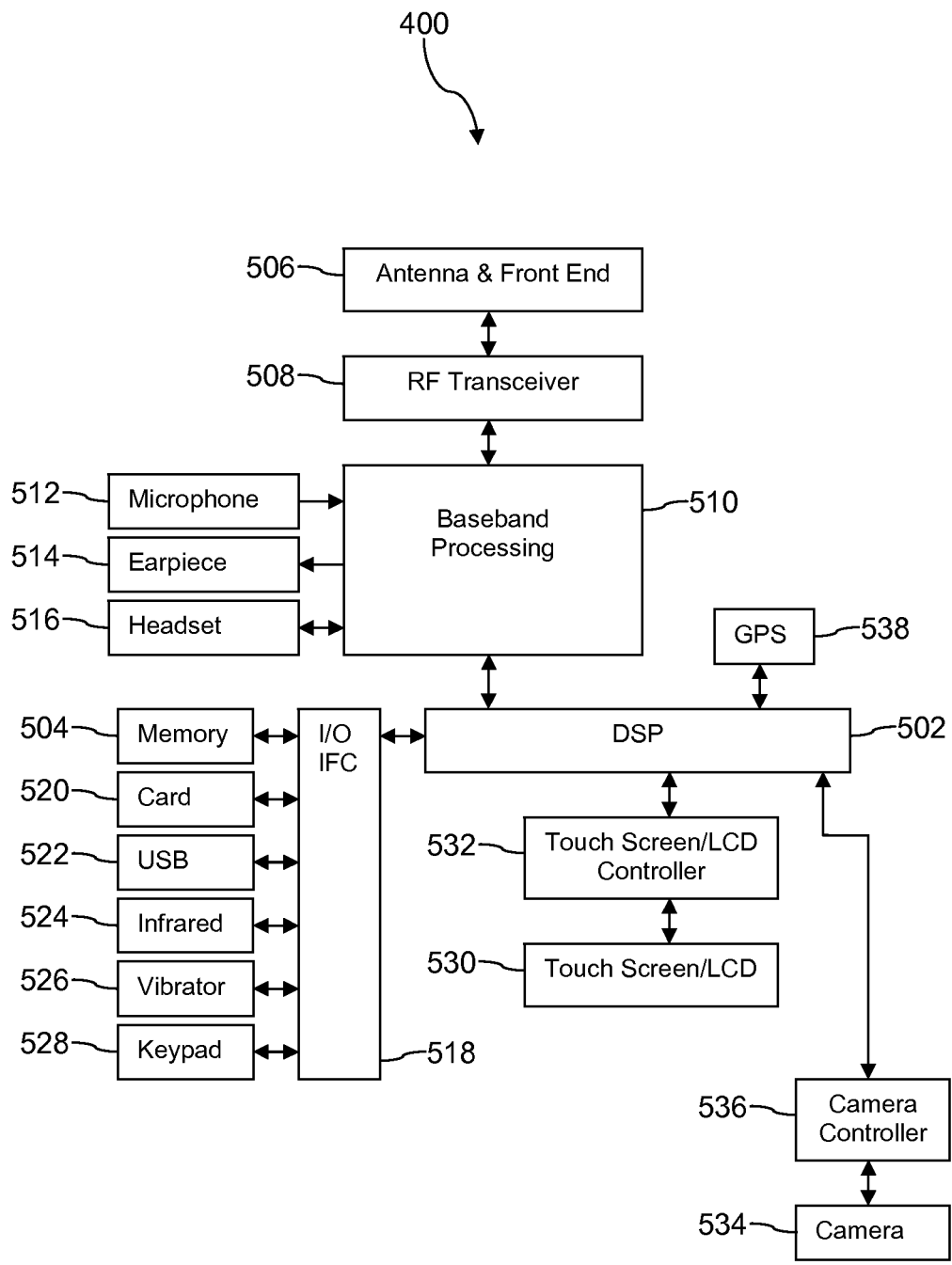
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
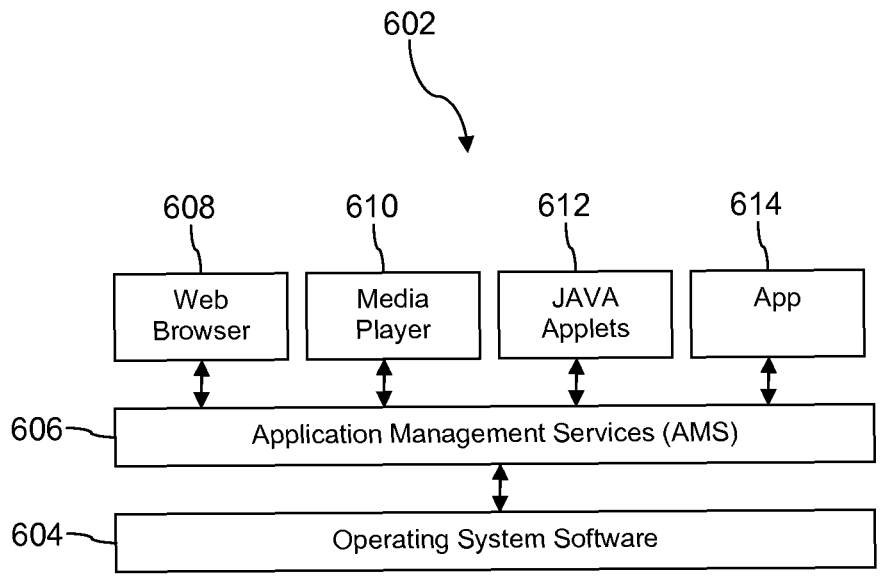
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
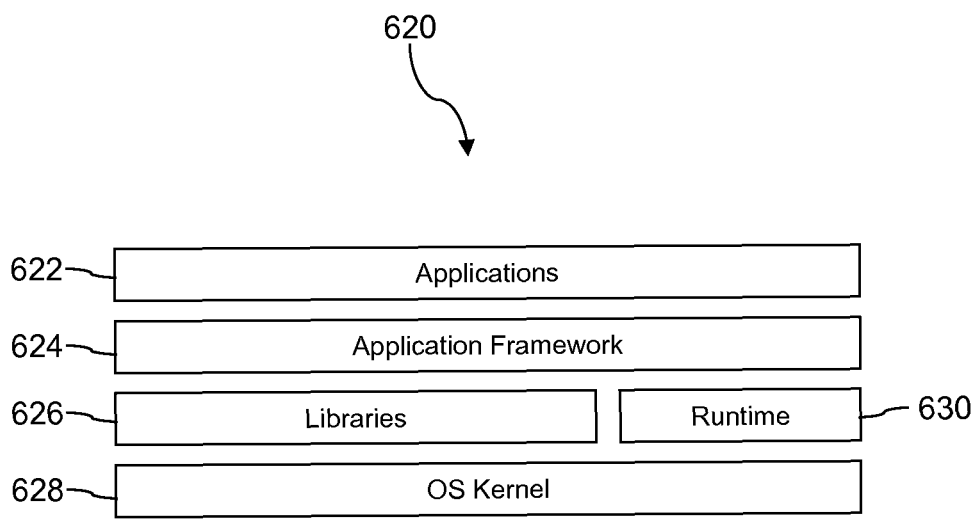
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
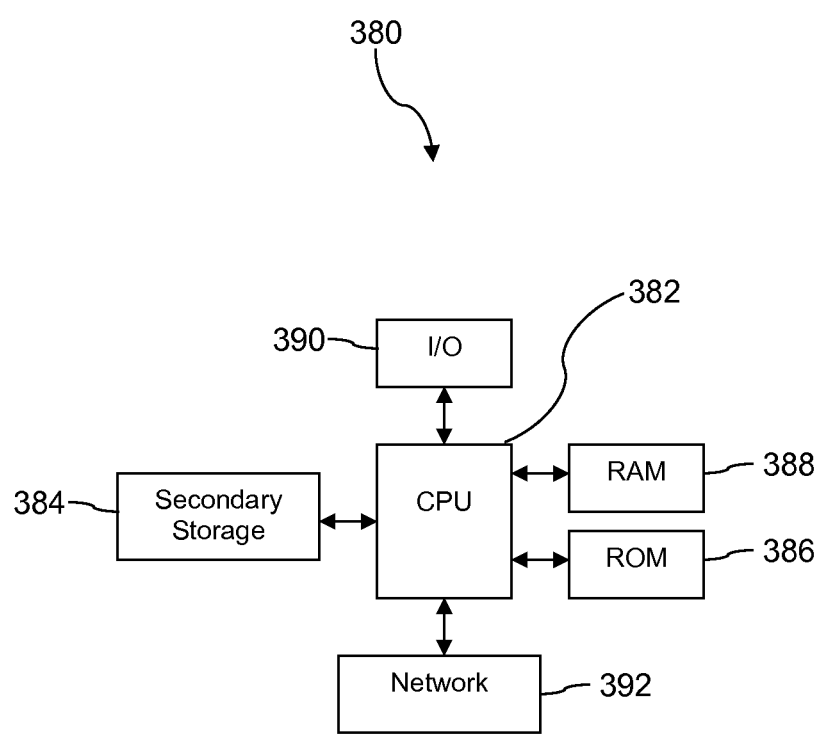
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An application server for non-returned return merchandise authorization (RMA) asset recovery, comprising:
    a memory;
    a processor; and
    an application stored in the memory that, when executed by the processor:
        examines related entries in a data store for status of a plurality of return merchandise authorization mobile communication devices,
        records a shipment date of a replacement mobile communication device corresponding to one of the plurality of return merchandise authorization mobile communication devices,
        calculates an elapsed time since shipment of the replacement mobile communication device unless the one of the plurality of return merchandise authorization mobile communication devices is received that was replaced by the replacement mobile communication device,
        examines provisioning status of the plurality of return merchandise authorization mobile communication devices,
        responsive to the one of the plurality of return merchandise authorization mobile communication devices being associated with a new telephone number, suspends communication service to the one of the plurality of return merchandise authorization mobile communication devices and the corresponding replacement mobile communication device, and
        responsive to the one of the plurality of return merchandise authorization mobile communication devices not being received, suspends communication service to the replacement mobile communication device by sending a notice to an application programming interface.

2. The application server of claim 1, wherein the application further sends a reminder to the replacement mobile communication device for returning the return merchandise authorization mobile communication device.

3. The application server of claim 1, further comprising, determining whether the return merchandise authorization mobile communication device is provisioned for communication service.

4. The application server of claim 3, further comprising, flagging the return merchandise authorization mobile communication device prevent it from being activated in the future, wherein the return merchandise authorization mobile communication device has not been provisioned for communication service.

5. The application server of claim 3, further comprising, suspending communication service for the return merchandise authorization mobile communication device, wherein the return merchandise authorization mobile communication device is determined to have been provisioned for communication.

6. The application server of claim 5, wherein communication service for the return merchandise authorization mobile communication device is suspended when the elapsed time reaches the predefined amount.

7. The application server of claim 5, wherein communication service for the return merchandise authorization mobile communication device is suspended responsive to the replacement mobile communication device being activated.

8. A method of recovering a non-returned return merchandise authorization (RMA) asset, comprising:
    storing shipment status of replacement mobile communication devices at a data store;
    storing entries with status of a plurality of return merchandise authorization mobile communication devices on the data store;
    examining related entries in the data store for the status of the plurality of return merchandise authorization mobile communication devices to determine whether the plurality of return merchandise authorization mobile communication devices have been received;
    recording a shipment date of a replacement mobile communication device by an application on an application server, the replacement mobile communication device corresponding to the one of the plurality of return merchandise authorization mobile communication devices;
    calculating an elapsed time since the shipment date of the replacement mobile communication device unless the one of the plurality of return merchandise authorization mobile communication devices is received that was replaced by the replacement mobile communication device;

examining provisioning status of the plurality of return merchandise authorization mobile communication devices;

responsive to the one of the plurality of return merchandise authorization mobile communication devices being associated with a new telephone number, suspending communication service to the one of the plurality of return merchandise authorization mobile communication devices and the corresponding replacement mobile communication device; and responsive to the one of the plurality of return merchandise authorization mobile communication devices not being received and based on the examining of the related entries in the data store:

when the elapsed time reaches a predefined amount, responsive to the replacement mobile communication device being received, sending a reminder to the replacement mobile communication device for returning the one of the plurality of return merchandise authorization mobile communication devices, when the elapsed time is one day larger than the predefined period of time, sending a notice to a first application programming interface (API) to suspend communication service to the one of the plurality of return merchandise authorization mobile communication devices and the replacement authorization mobile communication device, flagging in a provisioning data store the replacement authorization mobile communication device and the one of the plurality of return merchandise authorization mobile communication devices that has passed a due date for return, and suspending communication service to the replacement mobile communication device by provisioning the replacement mobile communication device associated with the one of the plurality of return merchandise authorization mobile communication devices that has passed the due date for return by a second API on a provisioning server.

9. The method of claim 8, wherein the mobile communication device is one of a laptop computer, a notebook computer, a tablet computer, a mobile phone, or a personal digital assistant (PDA).

10. The method of claim 8, wherein the mobile communication device is provided with radio communications by a radio frequency transceiver within the mobile communication device based on at least one of code division multiple access (CDMA), global system for mobile communication (GSM), long term evolution (LTE), or worldwide interoperability for microwave access (WiMAX) wireless communication protocols.

11. The method of claim 8, wherein shipment of the replacement mobile communication device triggers the transmission of updates on the status of the replacement mobile communication device from a warehouse data store to the data store.

12. The method of claim 8, wherein responsive to a return merchandise authorization mobile communication device without a return merchandise authorization number being received, a mobile equipment identifier (MEID) is determined for the application to identify the associated return merchandise authorization mobile communication device.

13. A method of recovering a non-returned return merchandise authorization (RMA) asset, comprising:

recording a shipment date of a replacement mobile communication device by an application on an application server;

calculating an elapsed time since the shipment date of the replacement mobile communication device unless a return merchandise authorization mobile communication device corresponding to the replacement mobile communication device is received;

examining provisioning status of a plurality of return merchandise authorization mobile communication devices, the return merchandise authorization mobile communication device included among the plurality of return merchandise authorization mobile communication devices;

responsive to the return merchandise authorization mobile communication device being associated with a new telephone number, suspending communication service to the return merchandise authorization mobile communication device and the corresponding replacement mobile communication device; and responsive to the return merchandise authorization mobile communication device not being received:

when the elapsed time is one day larger than the predefined period of time, suspending communication service to the replacement merchandise authorization mobile communication device by sending a notice to an application programming interface, and flagging the return merchandise authorization mobile communication device that has passed a due date for return in a provisioning data store.

14. The application server of claim 13, further comprising, when the elapsed time reaches a predefined amount, sending a reminder to the replacement mobile communication device for returning the return merchandise authorization mobile communication device.

15. The method of claim 14, wherein a phone call, an email message, and a short message service (SMS) message are sent as a reminder to the replacement mobile communication device to remind a user about returning the return merchandise authorization mobile communication device.

16. The application server of claim 13, further comprising, determining whether the return merchandise authorization mobile communication device is provisioned for communication service.

17. The application server of claim 13, further comprising, flagging the replacement mobile communication device by a provisioning server, wherein the replacement mobile communication device is associated with the return merchandise authorization mobile communication device when the elapsed time is larger than the predefined period of time.

18. The application server of claim 13, wherein tracking status of the return merchandise authorization mobile communication device is sent to the data store.

19. The application server of claim 13, wherein responsive to a return merchandise authorization mobile communication device being undeliverable after shipment, the replacement mobile communication device is exempt from communication service suspension.

20. The application server of claim 13, wherein responsive to a return merchandise authorization process being cancelled without a receipt, the data store is updated with the cancellation.

* * * * *